C. H. THURSTON.

Modes of Attaching Knobs to Screws.

No. 5,633. Reissued Oct. 28, 1873.

Witnesses.
S. N. Piper.
L. W. Höller.

Charles H. Thurston.
by his attorney.
R. H. Eddy.

AM. PHOTO-LITHOGRAPHIC CO. N.Y. (OSBORNE'S PROCESS)

UNITED STATES PATENT OFFICE.

CHARLES H. THURSTON, OF MARLBOROUGH, NEW HAMPSHIRE.

IMPROVEMENT IN THE MODES OF ATTACHING KNOBS TO SCREWS.

Specification forming part of Letters Patent No. 77,550, dated May 5, 1868; reissue No 5,633, dated October 28, 1873; application filed October 8, 1873.

*To all whom it may concern:*

Be it known that I, CHARLES H. THURSTON, of Marlborough, of the county of Cheshire, of the State of New Hampshire, have made a new and useful invention having reference to Wooden Knobs or Handles and their Attachment to Furniture or other articles; and I do hereby declare the same to be fully described in the following specification and represented in the accompanying drawings, of which—

Figure 1:
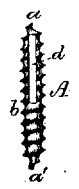
Figure 2:
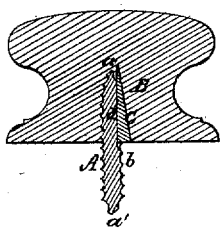

Figure 1 represents a double gimlet-pointed screw made in accordance with my invention, and for being inserted and fixed into a knob body or a handle by means as represented in Fig. 2, which exhibits a sectional view of such knob-body with the screw applied to it.

For conveniently attaching to articles, mineral knobs (the latter prior to my invention) have been provided with screws inserted in them while the material composing them was in a molten or plastic state; but in knobs, or similar articles made of wood, screws cannot be inserted in such a manner, and for the want of a better way it has been customary in connecting such wooden knobs with drawers, doors, ceilings, or various other articles, to pass a screw through each knob into the article, or to pass the screw through the article into the knob. Such frequently brought the head of the screw into a position where it could be readily seen, and where it would cause the knob to have an unsightly appearance.

It is much better to have the knob "head" or "body" and the screw so connected that the latter may project from the center of the shoulder or base of the former, as in such case the insertion of the screw in an article to which the knob is to be connected may be accomplished simply by revolving the screw by means of the hand of a person applied to the body or head.

My improved knob attachment, exhibited in the accompanying drawings at A, consists of a rod or wire, provided with "gimlet-points" *a* *a'* at its opposite ends, and a screw-thread, *b*, continuous throughout its length, and arranged with the gimlet-points in manner as represented. Furthermore, the screw is grooved longitudinally, as shown at *d*, from or near its middle to or near one of the gimlet-points, in order that after the said screw may have been screwed in the body B of the knob (see Fig. 2) a key, C, may be driven into such body and such groove. When the said key is so inserted the screw cannot be farther revolved within the body of the knob, and becomes permanently fixed therein, so that the knob or the screw thereof by simply revolving the knob may be screwed into the article, so as to bring the base of the body of the knob close up to such article, and have no part of the screw in sight.

What I claim as my invention is as follows, viz:

1. A knob attachment, consisting of a screw, as represented, without any central projection or shoulder, having gimlet-points at its opposite ends, and a groove arranged with and in the thread, substantially in manner, and for reception of a key, as specified.

2. A knob, composed of a head or body, B, a grooved screw, A, and the key C, all constructed and arranged substantially as set forth.

CHAS. H. THURSTON.

Witnesses:

R. H. EDDY,

J. R. SNOW.